United States Patent [19]
Shioya et al.

[11] Patent Number: 6,096,417
[45] Date of Patent: Aug. 1, 2000

[54] COMPOSITE MATERIAL HAVING POLYPROPYLENE RESIN MOLDED BODY AND POLYPROPYLENE RESIN FOAMED BODY AND METHOD OF PRODUCING SAME

[75] Inventors: Satoru Shioya, Tochigi-ken; Mitsuru Shinohara; Hisao Tokoro, both of Utsunomiya, all of Japan

[73] Assignee: JSP Corporation, Japan

[21] Appl. No.: 09/173,739

[22] Filed: Oct. 16, 1998

[30] Foreign Application Priority Data

Oct. 24, 1997 [JP] Japan .................................. 9-309643

[51] Int. Cl.$^7$ ....................................................... B32B 5/18
[52] U.S. Cl. ............................................................ 428/318.6
[58] Field of Search ........................................... 428/318.6

[56] References Cited

U.S. PATENT DOCUMENTS

| | | | |
|---|---|---|---|
| 5,474,841 | 12/1995 | Matsuki | 428/304.4 |
| 5,709,925 | 1/1998 | Spengler | 428/198 |
| 5,928,776 | 7/1999 | Shioya | 428/316.6 |

FOREIGN PATENT DOCUMENTS

| | | |
|---|---|---|
| 0224265 | 6/1987 | European Pat. Off. . |
| 0591553 | 4/1994 | European Pat. Off. . |
| 0703049 | 3/1996 | European Pat. Off. . |
| 0775722 | 5/1997 | European Pat. Off. . |
| 0823443 | 2/1998 | European Pat. Off. . |
| 0263989 | 4/1998 | European Pat. Off. . |
| 0841155 | 5/1998 | European Pat. Off. . |

*Primary Examiner*—Paul R. Michl
*Attorney, Agent, or Firm*—Lorusso & Loud

[57] ABSTRACT

A composite material including a polypropylene resin molded body having a melting point MB° C., and a foamed body of expanded particles fuse-bonded to the molded body, wherein the foamed body has at least two endothermic peaks in DSC curve thereof at peak temperatures of 135° C. or more, wherein the highest temperature endothermic peak thereof is at a peak temperature of PH° C. which is not lower than (MB−5)° C. and has such an area at temperatures not lower than (MB−5)° C. that corresponds to a calorific value in the range of at least 8 J/g, and wherein the peel strength between the molded body and the foamed body is at least 1.5 kg/15 mm. The composite material is produced by molding the expanded particles in a mold cavity in which the molded body is previously placed.

12 Claims, 3 Drawing Sheets

FIG. 3B  FIG. 3A
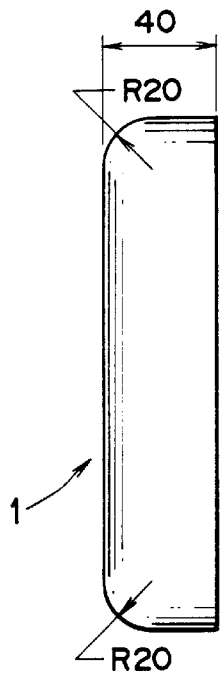
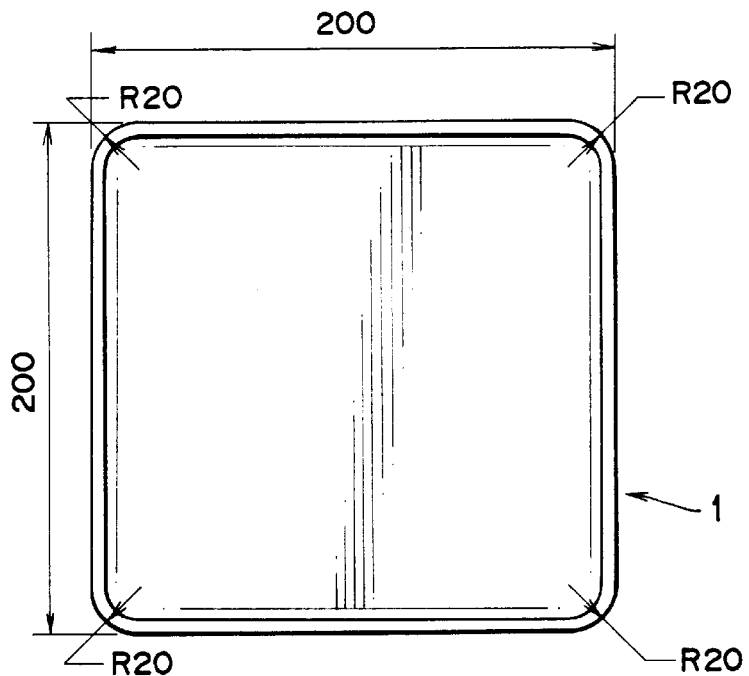
FIG. 4A  FIG. 4B
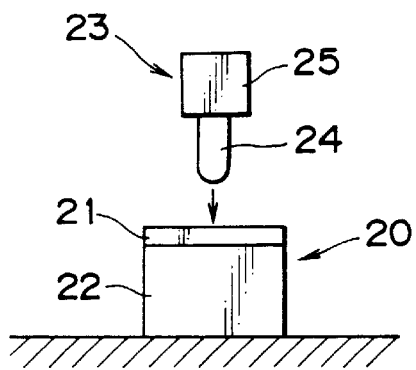
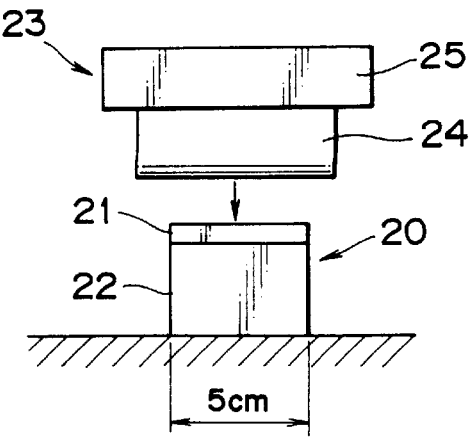

COMPOSITE MATERIAL HAVING POLYPROPYLENE RESIN MOLDED BODY AND POLYPROPYLENE RESIN FOAMED BODY AND METHOD OF PRODUCING SAME

BACKGROUND OF THE INVENTION

This invention relates generally to a composite polypropylene resin article useful as an exterior material, an interior material or a bumper of automobiles and, more particularly, to a composite material having a polypropylene resin molded body to which a polypropylene resin foamed body is fuse-bonded. The present invention is also directed to a method of producing the above composite material.

A polypropylene resin is now used as exterior materials, interior materials and bumpers of automobiles because of its excellent resistance to solvents, low specific gravity, good rigidity, good cost balance and capability of reuse. With regard to bumpers, the recent trend is toward the use of light weight materials for reasons of reduction of fuel consumption. Thus, there is a great demand for bumpers having a reduced weight and, yet, high mechanical strengths, especially good shock absorbing properties.

JP-A-H5-13874 discloses a five-layered bumper composed of a core of a foamed polypropylene resin molded body interposed between and fuse-bonded to a pair of polypropylene resin layers with fusible adhesive layers. The use of adhesive layers causes increased production costs and prevents recycled uses of the polypropylene resin.

JP-A-H9-39019 discloses a bumper composed of a polypropylene resin hollow molded body and a foamed resin core provided within the hollow molded body. The core is formed by foaming expanded resin particles within the hollow space of the molded body so that the core is fuse-bonded to the hollow molded body. This bumper has problems, however, because of a difficulty to produce the hollow molded body and because of a weak bonding between the core and the molded body.

SUMMARY OF THE INVENTION

It is, therefore, an object of the present invention to provide a composite polypropylene resin article useful as an exterior material, an interior material (e.g. instrument panel, pillar or door panel) or a bumper of vehicles and having a polypropylene resin molded body to which a polypropylene resin foamed body is tightly fuse-bonded so that, the foamed body cannot be delaminated from the molded body without breakage of the cells of the foamed body.

Another object of the present invention is to provide a light weight composite material useful as a bumper and having excellent shock absorbing properties.

It is a further object of the present invention to provide a method of producing the above composite material.

In accomplishing the foregoing objects, there is provided in accordance with one aspect of the present invention a method of producing a composite material, comprising the steps of:

placing a polypropylene resin molded body having a melting point MB° C. in a mold cavity defined between inside walls of first and second molds such that said molded body is in contact with said inside wall of said first mold, filling said mold cavity with polypropylene resin expanded particles, and heating said expanded particles within said mold cavity to mold said expanded particles, thereby to produce said composite material having said polypropylene molded body and a foamed body of said expanded particles fuse-bonded to said molded body, wherein said foamed body has at least two endothermic peaks in DSC curve thereof at peak temperatures of 135° C. or more, and wherein the highest temperature endothermic peak thereof is at a peak temperature of PH° C. which is not lower than (MB−5)° C. and has such an area at temperatures not lower than (MB−5)° C. that corresponds to a calorific value in the range of at least 10 J/g.

In another aspect, the present invention provides a composite material comprising a polypropylene resin molded body having a melting point MB° C., and a foamed body of expanded particles fuse-bonded to said molded body, wherein said foamed body has at least two endothermic peaks in DSC curve thereof at peak temperatures of 135° C. or more, wherein the highest temperature endothermic peak thereof is at a peak temperature of PH° C. which is not lower than (MB−5)° C. and has such an area at temperatures not lower than (MB−5)° C. that corresponds to a calorific value in the range of at least 10 J/g, and wherein the peel strength between said molded body and said foamed body is at least 1.5 kg/15 mm.

In the present specification and claims, the terms "DSC curve", "melting point MB", "endothermic peak", "highest temperature endothermic peak", "peak temperatures PH and PL", "lowest temperature endothermic peak" and "area of an endothermic peak at temperatures not lower than (MB−5)" are defined as follows:

"DSC curve" is a curve obtained by differential scanning calorimetry and examples of DSC curves are schematically illustrated in FIG. 1 and designated by the reference numerals 100 and 200.

"Endothermic peak" is a peak in a DSC curve of a resin attributed to the absorption of heat during the course of the heating of the resin for fusing. In FIG. 1, there are two endothermic peaks P1 and P2 in the DSC curve 100, while there is a single endothermic peak P3 in the DSC curve 200.

"Melting point MB" is a melting point of a polypropylene resin molded body as determined by the DSC analysis and is measured in the following manner. A portion of the molded body is cut out to obtain a sample having a weight of about 1–3 mg. The sample is subjected to DSC analysis. Thus, the sample is heated at a rate of 10° C./min to 220° C. in an atmosphere of nitrogen. The heated sample is then cooled at a rate of 10° C./min to about 40° C. Thereafter, the sample is again heated at a rate of 10° C./min to 220° C. in an atmosphere of nitrogen to give the DSC curve 200 as shown in FIG. 1. The peak temperature of the endothermic peak P3 in the range of 130–180° C. in the DSC curve represents the melting point MB.

When the molded body contains two or more different polypropylene resins, two or more endothermic peaks may be observed in the second DSC curve. In this case, the melting point MB is the peak temperature of that peak which has the highest temperature of all.

"Peak temperature PH" is a peak temperature of the "highest temperature endothermic peak" (P2) in a DSC curve of a polypropylene resin foamed body, as illustrated at 100 in FIG. 1. The DSC curve herein is as obtained by the differential scanning calorimetric analysis wherein a sample (about 1–3 mg) is heated from room temperature to 220° C. at a rate of 10° C./min in an atmosphere of nitrogen. At least two endothermic peaks are present at peak temperatures of 135° C. or more. Among the at least two endothermic peaks, the "highest endothermic peak" is ascribed to a secondary structure of the polypropylene expanded particles from which the foamed body is formed. The "lowest temperature endothermic peak" (P1 in FIG. 1) is at a peak temperature PL.

"Area of an endothermic peak at temperatures not lower than (MB−5)" represents a part of the calorific value of an endothermic peak at temperatures higher than (MB−5) in a DSC curve of a polypropylene resin foamed body. This area is determined as follows. In the DSC curve 100 as shown in FIG. 1, a straight line 300 extending between the point Z1 in the curve 100 at 80° C. and the point Z2 in the curve at the melt completion temperature Tmc is drawn. Next, a line 400 which is parallel with the ordinate is drawn at a temperature equal to the melting point (MB−5). The area Q defined by the line 300, line 400 and DSC curve 100 represents the area of an endothermic peak at temperatures not lower than (MB−5).

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIG. 3(a) is a plan view of a skin body used in Example 1;

FIG. 3(b) is a side view of FIG. 3(a);

FIG. 4(a) is an elevational view schematically illustrating a manner in which a test piece is measured for its compression elasticity; and FIG. 4(b) is a side view of FIG. 4(a).

DETAILED DESCRIPTION OF THE PREFERRED EMBODIMENTS OF THE INVENTION

Figure 1:
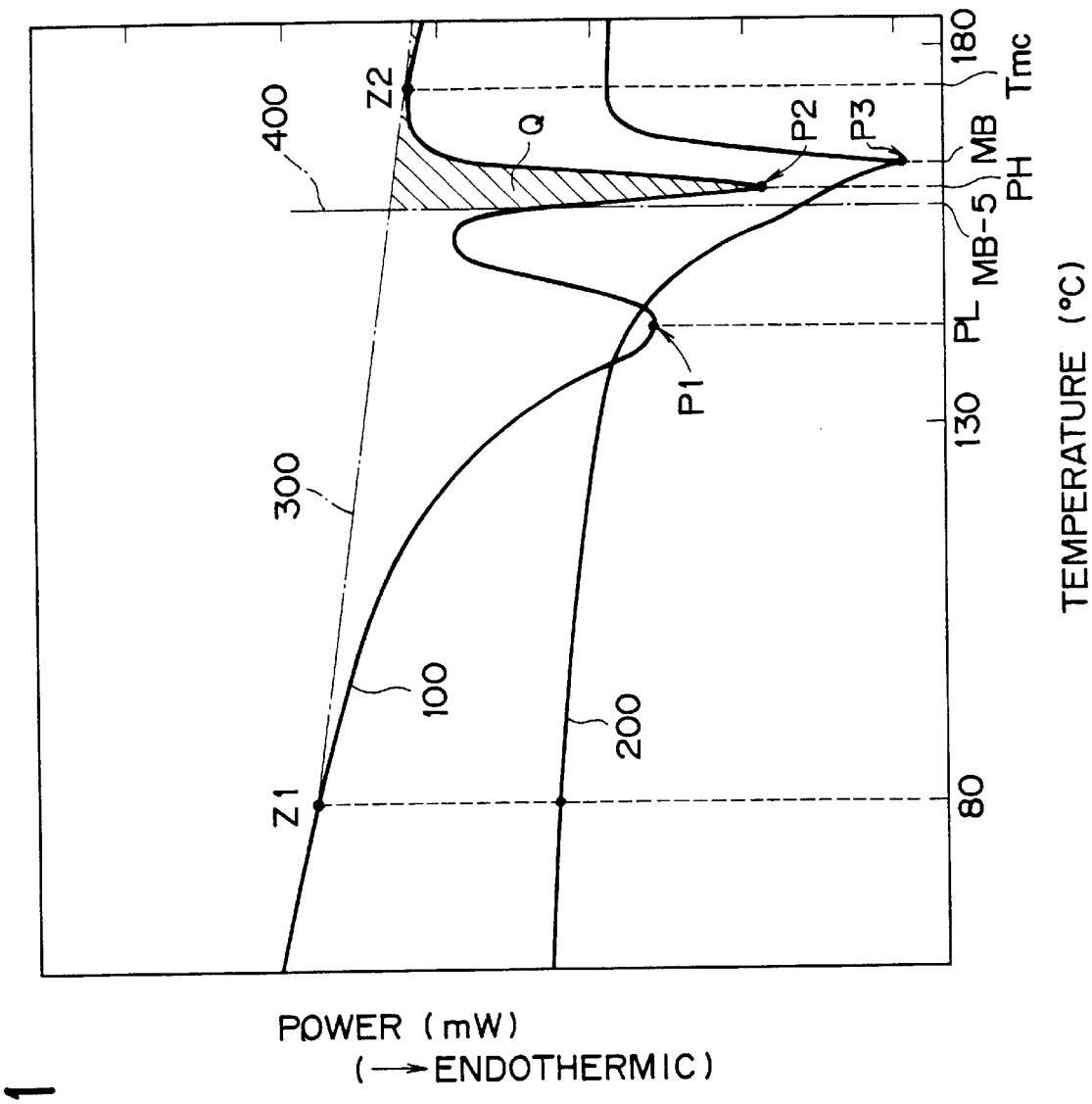
FIG. 1 shows DSC curves of a polypropylene resin foamed body and a polypropylene resin molded body of a composite material according to the present invention.

In the method of producing a composite material according to the present invention, polypropylene resin expanded particles are molded in a mold cavity in which a polypropylene molded body is previously placed, so that the molded body is composited with a foamed body of the expanded particles by fuse-bonding. During the molding, surfaces of the expanded particles are fused. The expanded particles having the fused surfaces are bonded to each other with the space between the particles being filled due to the secondary expansion and/or the restoring forces of the expanded particles, thereby forming the foamed body.

The polypropylene resin of which the molded body is formed is preferably of a type which is excellent in rigidity, heat resistance, shock resistance at low temperatures and printability and, thus, which is suited for use as bumpers and/or interior and exterior materials for vehicles. A polypropylene resin molded body having a melting point MB not lower than 155° C. is preferably used.

Illustrative of polypropylene resins are polypropylene homopolymers, propylene-ethylene block copolymers, propylene-ethylene random copolymers and propylene-ethylene-butene random copolymers. These polypropylene resins may be used by themselves or as a mixture of two or more.

The polypropylene resin may also be used in combination of one or more additional resins such as polyolefin resins, e.g. another polypropylene resin having a melting point lower than 155° C., linear very low density polyethylenes, branched low density polyethylenes, linear low density polyethylenes, medium density polyethylenes, high density polyethylenes and polybutene resins; and synthetic rubbers, e.g. ethylene-propylene rubbers, ethylene-propylene-diene rubbers, ethylene-butene rubbers, ethylene-hexene rubbers, ethylene-pentene rubbers and ethylene-octene rubbers. The polyolefin resin may be used in an amount of 50 parts by weight or less, preferably 40 parts by weight or less, per 100 parts by weight of the polypropylene resin. The synthetic rubber may be used in an amount of 350 parts by weight or less, preferably 240 parts by weight or less, per 100 parts by weight of the polypropylene resin.

The polypropylene resin may also be blended with one or more additives such as a filler, a stabilizer, a reinforcing material, a pigment and a lubricant.

The polypropylene molded body may be obtained from the polypropylene resin and, optionally, the additional resin and/or the additives, by any conventional molding method such as injection molding, stump molding, extrusion molding which may be followed by press molding (e.g. a sheet is first formed by extrusion and then pressed), air press molding or vacuum molding. The polypropylene molded body may also be obtained during the production of the composite material of the present invention in a pair of molds.

The polypropylene resin molded body has a melting point of MB° C.

As described previously, the polypropylene resin molded body is composited with a foamed body of polypropylene expanded particles by using a pair of molds. The foamed body has at least two endothermic peaks in DSC curve thereof at peak temperatures of 135° C. or more, and wherein the highest temperature endothermic peak thereof is at a peak temperature of PH° C. which is not lower than (MB−5)° C., preferably between (MB−5)° C. and (MB+15)° C., more preferably between (MB−5)° C. and (MB+5)° C. The highest temperature endothermic peak has such an area at temperatures not lower than (MB−5)° C. that corresponds to a calorific value Q of in the range of at least 8 J/g, preferably 8–50 J/g, more preferably 8–40 J/g. By using the above specific polypropylene resin foamed body, the adhesion between the foamed body and the polypropylene molded body is significantly improved. In particular, the adhesion therebetween is such as to provide a peel strength of at least 1.5 kg/15 mm. Moreover, the specific properties of the polypropylene resin foamed body can prevent shrinkage thereof after the molding thereof into the composite material.

The term "peel strength" used herein is as measured in accordance with Japanese Industrial Standard JIS Z0237 (1991) "Testing Methods of Pressure Sensitive Adhesive Tapes and Sheets; Adhesive Strength; 90 degree peeling method". The test is performed at 23° C., under a relative humidity of 50% with a peeling speed of 100 mm/minute. The test piece has a width of 15 mm.

The polypropylene resin for use in the foamed body may be a propylene homopolymer or a propylene copolymer such as a propylene-ethylene block copolymer, a propylene-ethylene random copolymer, a propylene-butene random copolymer or a propylene-ethylene-butene random copolymer. The propylene content in the propylene copolymer is preferably 75–97% by weight in the case of a block copolymer or 93–99.7% by weight in the case of a random copolymer. The melting point of the polypropylene resin is preferably at least 135° C., more preferably at least 142° C., for reasons of satisfactory heat resistance and rigidity of the foamed body. The upper limit of the melting point of the polypropylene resin is preferably about 155° C. for reasons of moldability of the polypropylene resin expanded particles. The melting point of the polypropylene resin of the foamed body is determined in the same manner as that for measuring the melting point MB of the molded body.

The polypropylene resin may further contain an additional polymer, preferably a polyolefin polymer. Examples of such additional polymers include polyethylene resins such as linear very low density polyethylene, branched low density polyethylene, linear low density polyethylene, medium density polyethylene and high density polyethylene; polyolefin elastomers such as ethylene-propylene rubber, ethylene-butene rubber, ethylene-octene rubber and propylene-butene rubber; and polybutene resins. The amount of such an additional polymer is generally 30% by weight or less based on the total amount of the polypropylene resin and the additional polymer.

The expanded particles of the polypropylene resin from which the foamed body is obtained may be obtained by any known suitable method. In one suitable method, non-expanded polypropylene resin particles are contacted with a blowing agent such as an inorganic gas, a volatile blowing agent or a mixture thereof to impregnate the resin particles with the blowing agent, heated to a temperature higher than the softening point of the resin, dispersed in a dispersing medium, maintained under a pressurized condition in a vessel and then discharged into air so that the resin particles are expanded. The expanded resin particles preferably have a bulk expansion ratio of 3–60 (0.015–0.3 g/cm$^3$ in terms of bulk density), more preferably 3–30 (0.03–0.3 g/cm$^3$ in terms of bulk density), and contain secondary crystals.

It is important that the polypropylene resin expanded particles have a DSC curve by differential scanning calorimetry including at least two endothermic peaks. It is preferred that the highest temperature peak of the at least two endothermic peak has an area corresponding to the calorific value of 8–35 J/g for reasons of improved mechanical properties such as bending strength, improved production efficiency and prevention of formation of gaps between expanded particles of the foamed body.

The polypropylene foamed body having a DSC curve including at least two peaks can be produced by using polypropylene expanded particles having a DSC curve including at least two peaks. Such expanded particles may be obtained by maintaining a dispersion containing polypropylene resin particles at a temperature between the melting point thereof and the melt-completion temperature (intersecting point on a high temperature side between the base line and the endothermic peak) thereof for a period of time of 5–90 min, preferably 15–60 min. The area of the highest temperature peak may be adjusted by, for example, the temperature at which the polypropylene resin particles are maintained in the above conditions, the time for which the polypropylene resin particles are maintained in the above conditions and the kind of the blowing agent. The highest temperature peak is ascribed to the presence of secondary crystals and a method of measuring the highest temperature peak is explained in European patent publication No. EP-A-0823443 published Feb. 11, 1998, the disclosure of which is hereby incorporated by reference.

Figure 2:
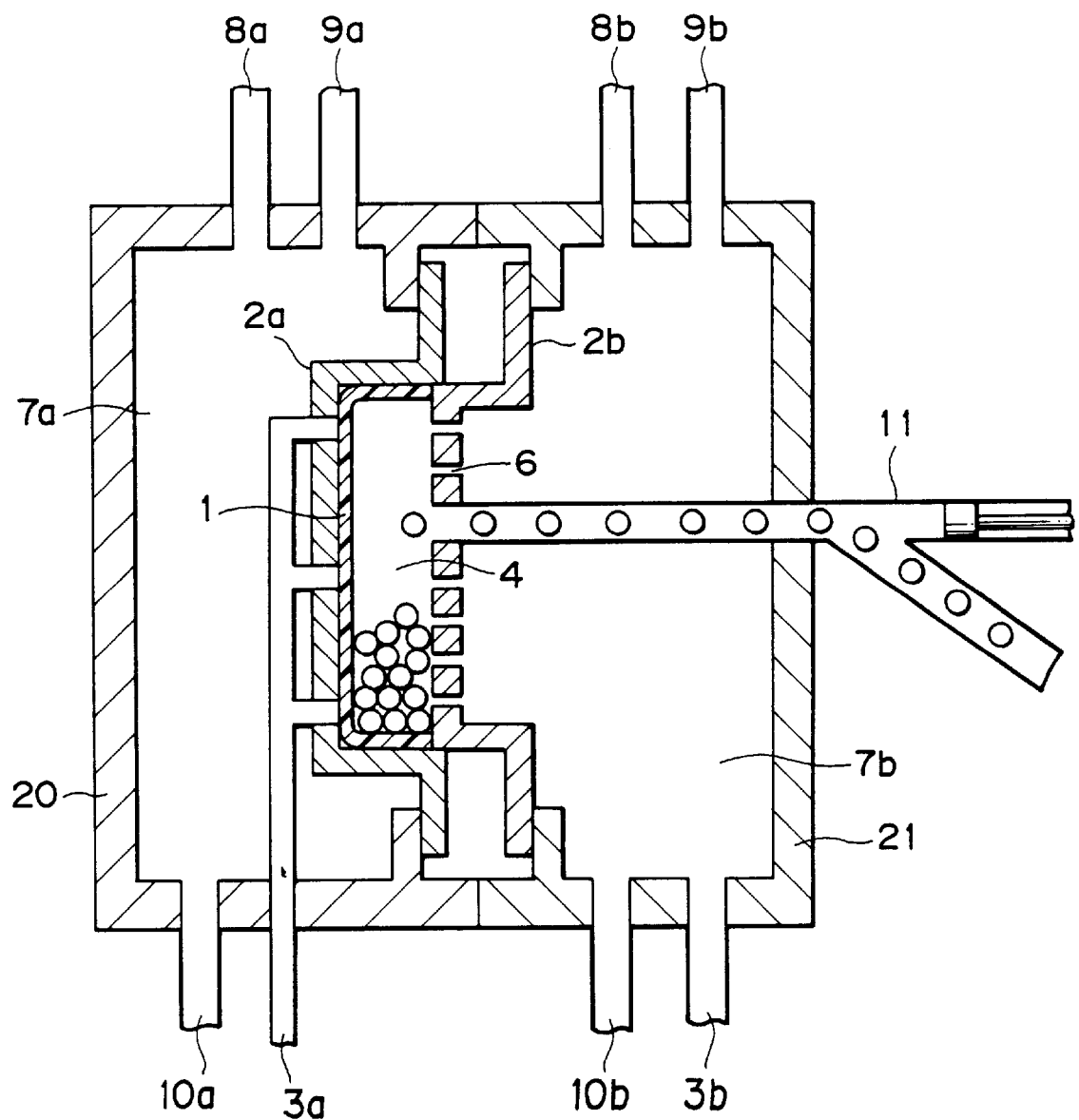
FIG. 2 is a cross-sectional, elevational view diagrammatically illustrating a molding device used for carrying out a method according to the present invention.

A method for preparing the composite material according to the present invention will now be described with reference to FIG. 2 which illustrates one preferred device for carrying out the method of the present invention.

The device has a pair of first and second frames 20 and 21 in which a pair of first and second molds 2a and 2b are disposed, respectively, to define first and second chamber 7a and 7b therebetween, respectively. The frame 20 is moveable relative to the frame 21 so that the first and second molds 2a and 2b are positionable between open and closed positions. In the closed position as shown in FIG. 2, a mold cavity 4 is defined between the molds 2a and 2b.

A molded body 1 is placed in the mold cavity 4 such that the molded body 1 faces the first mold 2a. The mold cavity 4 is then evacuated through a suction tube 3a and perforations 5 so that the molded body 1 is maintained in contact with the first mold 2a. If necessary, the molded body 1 may be previously shaped to fit the inside surface of the first mold 2a. Alternatively, the molded body 1 may be shaped by press molding with the first mold 2a. In this case, the laminate may be heated during the press molding, as desired.

The mold cavity 4 is then filled with expanded particles of a polypropylene resin introduced through a feeder 11. The expanded polypropylene resin particles in the mold cavity 4 are then heated with pressurized steam supplied through a pipe 8b to the second chamber 7b and slits 6 so that the particles are expanded and fuse bonded to each other, thereby to form a foamed body having a closed cellular structure and bonded to the molded body 1. A pressurized steam may also be fed through a pipe 8a to the first chamber 7a to heat the molded body 1 and to prevent the curling of the product. In this case, it is advisable not to permit the steam to enter the perforations 5 so that the molded body 1 is prevented from being deteriorating.

It is preferred that the heating of the polypropylene resin expanded particles in the mold for producing the composite material be at a temperature lower than (MB−5)° C. but higher than (PL−5)° C. wherein MB and PL are the melting point of the molded body 1 and the peak temperature of the lowest temperature endothermic peak P1 of the foamed body obtained from the expanded particles for reasons of prevention of shrinkage of the foamed body and attainment of high mechanical strengths of the composite material and tight fuse-bonding between the foamed body and the molded body 1. The peak temperature PL of the lowest temperature endothermic peak of the foamed body is substantially the same as that of the expanded particles.

Before heating the expanded particles, it is preferable to substitute steam for air present between the expanded particles charged in the mold cavity 4. Thus, a drain discharge pipe 10b is connected to the second chamber 7b and is maintained in an open state so that the steam fed to the chamber 7b through the pipe 8b is discharged together with air, before commencing the expansion of the expanded particles. In this case, the second chamber 7b may be evacuated through a suction tube 3b to facilitate the removal of the air. In FIG. 2, designated as 9a and 9b are cooling water feeding conduits and as 10a is a drain discharge pipe.

The composite material according to the present invention can be in a three layer structure in which a foamed body is sandwiched between two molded bodies (or two skin bodies). Such a composite material may be prepared by placing the two molded bodies in contact with first and second molds, respectively. Expanded particles are then charged in the space between the two molded bodies and heated to obtain the foamed body having both sides fuse-bonded to the two molded bodies, respectively.

To facilitate the passage of the steam into the mold cavity 4, it is preferred that one or more steam feed pipes (not shown) be used. Each feed pipe has one end connected to the steam feed port 8b and the other end inserted into the mold cavity 4 so that the molding of the expanded particles in the mold cavity 4 can be efficiently performed. The steam feed pipes are desirably retracted from the mold cavity 4 before the start of cooling the composite material so that the formation of voids in the formed body due to the steam feed pipes can be prevented or minimized.

The composite material produced by the method of the present invention has significantly improved collision resisting properties such as excellent bending strength, energy absorbing properties and compression strengths (e.g. local compression modulus) and, hence, is suitably used as a bumper for vehicles.

For use as a bumper for vehicles, it is preferred that composite material have the following properties:

$0.6 \leq Y \leq 3.4$, preferably $1 \leq Y \leq 3$, $5-Y \leq 115X \leq 34.5-Y$ $P/D \geq 2500$, preferably $5000 \geq P/D \geq 3500$ wherein Y represents the thickness (mm) of the molded body, X represents the density (g/cm$^3$) of the foamed body, and P and D represent the local compression modulus (kg/cm) and the density (g/cm$^3$) of the composite material, respectively.

A thickness Y of the molded body below 0.6 mm tends to cause breakage thereof even with a slight impact. Too large a thickness in excess of 3.4 mm is disadvantageous because it is difficult to maintain the weight of the composite material below a required level.

When the condition of $(5-Y) \leq 115X \leq (34.5-Y)$ is not met, the energy absorbing properties of the composite material tend to be unsatisfactory. When P/D is lower than 2500 (kg/cm)/(g/cm$^3$), the composite material tends to show a difficulty in resisting even a slight impact shock.

It is also preferred that the composite material have a ratio (E/D (kg·cm/cm$^3$)/(g/cm$^3$)) of an energy absorption E (kg·cm/cm$^3$) through a 50% strain to the density D (g/cm$^3$) thereof of not smaller than 20, more preferably 25–40 (kg·cm/cm$^3$)/(g/cm$^3$), for reasons of improved energy absorbing characteristics.

The following examples will further illustrate the present invention. Parts and percentages are by weight.

EXAMPLES 1–5

A polypropylene resin (TX552 manufactured by Idemitsu Petrochemical Co., Ltd.; MI:15.7 g/10 min; melting point: 164° C.; calorific value for fusion: 69.4 J/g) was extruded through T-dies into sheets having thicknesses of 0.5, 1, 2, 3 and 4 mm. Each of the sheets was then subjected to press molding to obtain a skin body (molded body) 1 having a shape as illustrated in FIGS. 3(*a*) and 3(*b*). Using these skin bodies 1, composite materials were prepared with a molding device as shown in FIG. 2. Thus, each skin body 1 was placed in a first mold 2a having a cavity 4 with a size of 200 mm×200 mm×40 mm. The mold cavity 4 was evacuated by a vacuum pump through the suction pipe 3a so that the skin layer of the laminate was held in contact with the first mold 2a. After closing the first mold 2a with the second mold 2b, expanded particles of a propylene-ethylene random copolymer (ethylene content: 2.4%, melting point: 146.0° C., bulk expansion ratio: 8) whose cells had been previously adjusted to an air pressure of 1.8 atm were filled in the mold cavity 4 through a feed pipe 11. While maintaining the drain discharge pipe 10b open, steam was fed to the second chamber 7b for 5 seconds to purge the air between the expanded particles in the mold cavity 4. The drain pipe 10b was then closed and steam at 4.0 kg/cm$^2$ G was fed to the second chamber 7b to directly heat the expanded particles, while feeding steam at 4.0 kg/cm$^2$ G to the first chamber 7a to indirectly heat the expanded particles, so that the expanded particles were fused and expanded to form a foamed body bonded to the skin body 1. After cooling with water, the composite material in the mold cavity 4 was taken out, aged at 60° C. for 24 hours and the cooled to room temperature. The foamed body was found to show a highest temperature peak P2 at 161° C. and to have 15 J/g of calorific value Q corresponding to an area of the highest temperature peak P2 at temperatures higher than 159° C. (164–5)° C.

The properties of the thus produced composite materials are summarized in Table 1 below.

Comparative Example 1

Example 1 was repeated in the same manner as described except that the skin material was not used. The thus prepared foamed body was then piled up to a skin material (thickness: 3 mm) as prepared in Example 4 without using any adhesive to obtain a composite material having the properties shown in Table 2.

Comparative Example 2

Example 1 was repeated in the same manner as described except that the skin material was not used. The thus prepared foamed body was measured for the properties thereof. The results are shown in Table 2.

Comparative Example 3

Example 3 was repeated in the same manner as described except that expanded particles of a propylene-ethylene random copolymer used had an ethylene content of 4.0%, a melting point of 137.0° C. and a bulk expansion ratio of 8 and that the steam fed to the chambers 7a and 7b had a pressure of 3.0 kg/cm$^2$ G. The foamed body of the thus obtained composite material was found to show a highest temperature peak P2 at 152° C. and to have 2 J/g of a calorific value Q corresponding to an area of the highest temperature peak P2 at temperatures higher than 159° C. (164–5)° C. The properties of the thus produced composite material are shown in Table 2.

In Tables 1 and 2, the physical properties were measured as follows.

(1) Peel Strength (Adhesion Between Foamed Body and Skin Body)

In accordance with the 90 degree peeling method specified in Japanese Industrial Standard JIS Z0237 (1991), the adhesive strength is measured at 23° C., under a relative humidity of 50% with a peeling speed of 100 mm/minute. The test piece has a width of 15 mm. The adhesion is evaluated according to the following ratings:

A: 1.5 kg/15 mm or more

B: less than 1.5 kg/15 mm (2) Local Compression Modulus P

A composite material is cut into a block 20 having a length of 50 mm, a width of 50 mm and a height of 40 mm as shown in FIGS. 4(*a*) and 4(*b*). Designated as 21 and 22 are skin body and foamed body of the composite material 20, respectively. The block is placed on a flat table and is pressed at its center with a T-shaped jig 23 in the direction shown by the arrow at a pressing speed of 10 mm/minute. The jig 23 has a fixing section 25 and a pressing section 24 having a rounded tip end (radius of curvature: 5 mm), a width of 100 mm and a height of 60 mm. The fixing section 25 is operatively connected to a compression testing device. A load F (kg) is applied with the jig 23 to the sample while measuring the strain (%). The measurement is carried out at 23° C. The load F (ordinate) is plotted against the strain (abscissa; %). Local compression modulus P (kg/cm) is calculated as P=Δf/5 cm wherein Δf represents a gradient of that portion of the above plots where the load F is initially proportional to the strain.

(3) Total Energy Absorption Through 50% Strain E

In accordance with Japanese Industrial Standard JIS Z0234, a composite material with a size of 200 mm×200 mm×40 mm is compressed at 23° C. at a compressing speed of 10 mm/minute, while measuring the compression stress at varying compression strain. A total energy absorption through 50% strain E (kg·cm/cm$^3$) is a cumulative of the compression stress up to the 50% strain. Namely, the total strain E is an integrated value (area), from 0% strain to the 50% strain, of a curve of plots of the compression stress (ordinate, kg/cm$^2$) against the compression strain (abscissa, %), as disclosed in EP-B-0155558, FIG. 1. Also measured is a compression stress G (kg/cm$^2$) when the sample has been subjected to the 50% strain.

(4) Maximum Bending Stress H

A composite material is cut to obtain a sample having a length of 200 mm, a width of 25 mm and a height of 40 mm. The sample is subjected to bending test in accordance with Japanese Industrial Standard JIS K7221. Thus, the sample is supported, with the skin layer thereof being oriented upward, at both ends by a pair of supporting pillars having a span distance of 150 mm and each having a tip end with a radius of curvature of 10 mm. The sample is pressed at its middle portion by a jig having a rounded tip end (radius of curvature: 60 mm) while measuring a maximum bending stress H (kg/cm$^2$).

TABLE 2

| Comparative Example | 1 | 2 | 3 |
|---|---|---|---|
| Skin body Thickness Y (mm)* | 3 | 0 | 2 |
| Foamed body Density X (g/cm$^3$) | 0.106 | 0.106 | 0.106 |
| Composite material | | | |
| Adhesion | — | — | B |
| Weight (g) | 250 | 159 | 220 |
| Density D (g/cm$^3$) | 0.165 | 0.106 | 0.145 |
| Local compression modulus P (kg/cm) | 397 | 242 | 295 |
| P/D | 2406 | 2280 | 2030 |
| Compression stress at 10% strain (kg/cm$^2$) | 18.7 | 16.5 | 10.3 |
| Energy absorption through 50% strain E (kg·cm/cm$^3$) | 3.6 | 3.8 | 2.6 |
| E/D | 22 | 36 | 17.9 |
| Compression stress at 50% strain G (kg/cm$^2$) | 9 | 11 | 7 |
| Maximum bending stress H (kg/cm$^2$) | 23.1 | 22.3 | 15.2 |
| H/D | 140 | 210 | 108 |

*: Thickness of the skin body at a position thereof which is in contact with the jig used in the above measurement of local compression modulus P.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing a composite material, comprising the steps of:

providing a polypropylene resin non-foamed molded body having a melting point MB° C. in a mold cavity

TABLE 1

| Example | 1 | 2 | 3 | 4 | 5 |
|---|---|---|---|---|---|
| Skin body Thickness Y (mm)* | 0.5 | 1 | 2 | 3 | 4 |
| Foamed body Density X (g/cm$^3$) | 0.106 | 0.106 | 0.106 | 0.106 | 0.106 |
| Composite material | | | | | |
| Adhesion | A | A | A | A | A |
| Weight (g) | 174 | 195 | 220 | 246 | 263 |
| Density D (g/cm$^3$) | 0.119 | 0.130 | 0.145 | 0.164 | 0.172 |
| Local compression modulus P (kg/cm) | 345 | 476 | 646 | 701 | 781 |
| P/D | 2900 | 3660 | 4460 | 4270 | 4540 |
| Compression stress at 10% strain (kg/cm$^2$) | 17.0 | 17.8 | 20.2 | 23.2 | 25.7 |
| Energy absorption through 50% strain E (kg·cm/cm$^3$) | 3.8 | 3.9 | 3.7 | 3.7 | 3.7 |
| E/D | 32 | 30 | 26 | 23 | 22 |
| Compression stress at 50% strain G (kg/cm$^2$) | 10 | 11 | 9 | 10 | 11 |
| Maximum bending stress H (kg/cm$^2$) | 26.2 | 30.9 | 40.9 | 40.3 | 41.2 |
| H/D | 220 | 238 | 282 | 246 | 240 |

*: Thickness of the skin body at a position thereof which is in contact with the jig used in the above measurement of local compression modulus P.

defined between inside walls of first and second molds such that said molded body is in contact with said inside wall of said first mold, filling said mold cavity with polypropylene resin expanded particles having a DSC curve by differential scanning calorimetry including at least two endothermic peaks, wherein the highest temperature peak of the endothermic peaks has an area corresponding to a calorific value of 8–35 J/g, and heating said expanded particles within said mold cavity to mold said expanded particles, thereby to produce said composite material having said polypropylene molded body and a foamed body of said expanded particle fuse-bonded to said molded body, wherein said foamed body has at least two endothermic peak in DSC curve thereof at peak temperatures of 135° C. or more, and wherein the highest temperature endothermic peak thereof is at a peak temperature of PH° C. which is not lower than (MB−5)° C. and has such an area at temperature not lower than (NB−5)° C. that corresponds to a calorific value in the range of at least 8 J/g.

2. A method as claimed in claim 1, wherein the lowest temperature endothermic peak of said at least two endothermic peaks is at a peak temperature of PL° C., and wherein said heating is at a temperature lower than (MB−5)° C. but higher than (PL−5)° C.

3. A method as claimed in claim 1, wherein said melting point MB° C. is 155° C. or more.

4. A composite material comprising a polypropylene resin non-foamed molded body having a melting point MB° C., and a foamed body polypropylene resin of expanded particles fuse-bonded to said molded body, wherein said foamed body has at least two endothermic peaks in DSC curve thereof at peak temperatures of 135° C. or more, wherein the highest temperature endothermic peak thereof is at a peak temperature of PH° C. which is not lower than (MB−5)° C. and has such an area at temperatures not lower than (MB−5)° C. that corresponds to a calorific value in the range of at least 8 J/g, and wherein the peel strength between said molded body and said foamed body is at least 1.5 kg/15 mm.

5. A composite material as claimed in claim 4, and having an energy absorption through a 50% strain of E kg·cm/cm³ and a density of D g/cm³, wherein E/D is not smaller than 20 (kg·cm/cm³)/(g/cm³).

6. A method as claimed in claim 1 wherein said calorific values are at least 10 J/g.

7. A method as claimed in claim 1 further comprising, shaping non-foamed polypropylene resin to form the molded body and then placing the molded body in the mold cavity.

8. A method as claimed in claim 1 further comprising shaping non-foamed polypropylene resin in the mold cavity by pressing against the wall of the first mold to form the non-foamed molded body.

9. A composite material as claimed in claim 4 wherein said calorific value is at least 10 J/g.

10. A composite material as claimed in claim 4 wherein said MB is 155° C. or more.

11. A composite material as claimed in claim 4 having the following properties:

$$0.6 \leq Y \leq 3.4$$

$$5-Y \leq 115X \leq 34.5-Y$$

$$P/D \leq 2500$$

in which Y represents the thickness in mm of the molded body, X represents the density (g/cm³) of the foamed body, and P and D represents the local compression modulus (kg/cm) and the density (g/cm³) of the composite material, respectively.

12. A method as claimed in claim 1 wherein said heating of the polypropylene resin expanded particles in the mold for producing the composite material is at a temperature lower than (MB−5)° C. but higher than (PL−5)° C., wherein MB and PL are the melting point of the molded body and the peak temperature of the lowest temperature endothermic peak P1 of the foamed body.

* * * * *

UNITED STATES PATENT AND TRADEMARK OFFICE
CERTIFICATE OF CORRECTION

PATENT NO. : 6,096,417
DATED : August 1, 2000
INVENTOR(S) : Shioya et al.

It is certified that error appears in the above-identified patent and that said Letters Patent is hereby corrected as shown below:

Column 6,
Line 20, delete "being".

Column 11,
Line 31, after "body" insert -- of -- and after "resin" delete "of".

Signed and Sealed this

Thirteenth Day of November, 2001

Attest:

*Nicholas P. Godici*

NICHOLAS P. GODICI
*Attesting Officer*   *Acting Director of the United States Patent and Trademark Office*